3,283,014
ACETYLENIC ALCOHOLS FROM KETONES AND ACETYLENE USING AQUEOUS ALKALINE HYDROXIDE CATALYST
Agostino Balducci and Marcello de Maldé, San Donato Milanese, Italy, assignors to S.N.A.M. S.p.A., Milan, Italy, a company of Italy
Filed Mar. 11, 1963, Ser. No. 264,447
Claims priority, application Italy, Mar. 15, 1962, Patent 665,066
13 Claims. (Cl. 260—638)

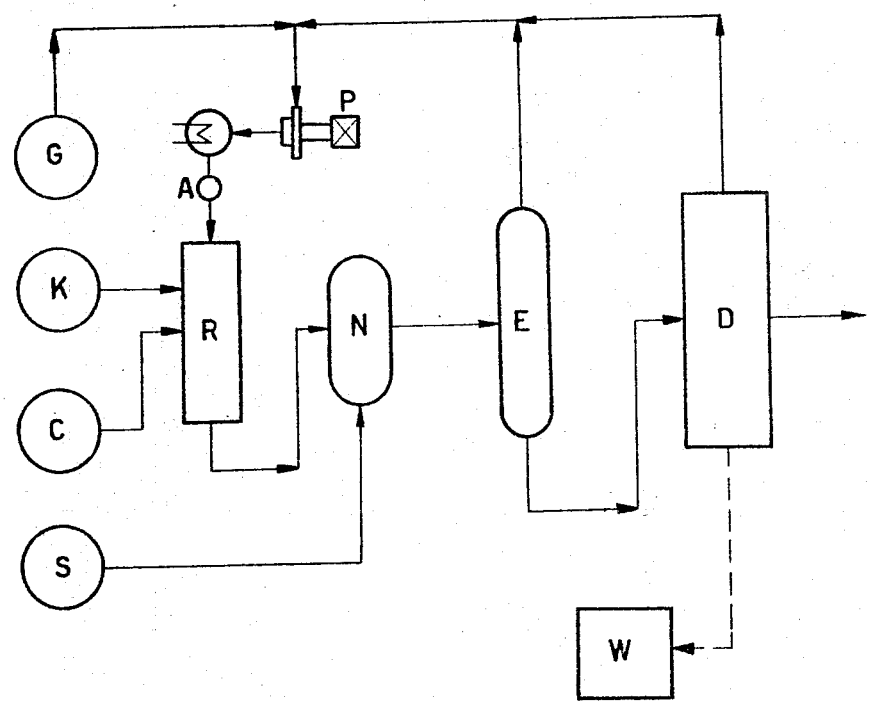

It is known that acetylenic alcohols, namely the alcohols of the acetylenic series, can be prepared in suitable conditions in liquid ammonia or other suitable solvents, by reaction of stoichiometric quantities of ketones with acetylides according to the scheme:

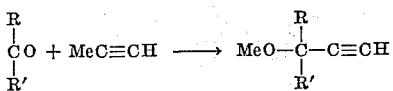

It is known how upon this reaction the presence of water, even in traces, acts negatively (Hurd and McPhee; J. Am. Chem. Soc. 69, 239, 1947).

There are also known processes for the preparation of acetylenic alcohols by condensation of acetylene with ketones in the presence of condensing agents, which may be in particular hydroxides of alkali metals, employed in molar quantities and at any rate not lower than the quantity of the ketones.

However, none of the known methods of preparing acetylenic alcohols is completely satisfactory. It is above all desirable to obtain not only high yields, possibly quantitative, calculated on the starting ketone, but also to dispense with the use of large quantities of condensating agents. It is also desirable to avoid as much as possible the formation of useless byproducts, deriving from the condensation of the starting ketones and the formation of acetylenic diols. In this respect the reaction conducted with the aid of alkaline acetylides, though it can be brought to absolutely anhydrous conditions and even high yields, is never quite satisfactory. Finally it is desirable to operate in conditions of maximum safety, namely in conditions in which the partial pressure of acetylene in the gaseous phase is held within modest limits, much lower than the explosive limits.

It has now been found that by a process forming the object of the present invention, it is possible to carry out the reaction of condensation of acetylene with a ketone, in particular acetone, in a completely satisfactory manner, obtaining all of the desirable results. In the process of this invention an ionizing but not hydrolizing solvent is used, an excess of acetylene is employed with respect to the ketone used, hydroxides of alkali metals are employed as catalysts in quantities not higher than one mole for ten moles of ketone and preferably of from 1 mole for 30 to 1 mole for 200 of ketone, the reaction is effected in the presence of a quantity of water that in the course of the reaction does not become more than 10% altogether by weight in respect to the solvent used, and the reaction is effected at temperatures of from −40° to +40° C., preferably of from +10° to +30° C. The above mentioned amount of water includes both the water that may be added as such and that may be present as hydration water of a reactant employed, and the water formed in the reaction. As an ionizing but not hydrolizing solvent ammonia liquid is preferred; and less advantageously also aliphatic amines are utilizable.

As a ketone there may be employed any aliphatic, aliphatic-aromatic or aromatic ketone, provided it is soluble in the solvent employed.

To obtain methyl butynol, the ketone employed is acetone, but it is possible to utilize, with equal effectiveness, also its condensation product, namely diacetone alcohol.

The quantity of acetylene should as said be in excess over the ketone. A molar acetylene to ketone ratio of 1.5 to 1 is utilizable, but it is preferable to arrive at a ratio of at least 2:1 and not to have a ratio higher than 10:1 for reasons of practical convenience.

If liquid ammonia is used, it has been found advisable to have a molar acetylene to ammonia ratio of from 3:7 to 3:30.

Consequently the total pressure is higher than the pressure required to keep the ammonia in the liquid state, since the partial acetylene pressure must be taken into account.

To operate in safety conditions, the partial pressure of acetylene in the gaseous phase at the beginning of the reaction should not be higher than 60% of the total pressure, due to the vapour pressure of ammonia and of acetylene, operating in the cited temperature range. The total pressure preferably varies from 1 to 18 atm. abs.

The quantity of solvent is not critical and may be varied within very wide limits, provided the above stated conditions are respected.

As a catalyst it is possible to employ any hydroxide of alkali metal, but sodium hydroxide and potassium hydroxide are preferred, specially the latter.

The use of the latter reduces even more the formation of byproducts.

When operating according to the invention, the yields with respect to the ketone are substantially quantitative. The conversions are good also in rather short periods, for instance it is possible to attain 94% conversion in about three hours' time.

However, it is possible to vary the duration of the reaction to obtain different conversions, according to what the case may be. In particular if operation is continuous high conversions for every pass may be unnecessary. The reaction proceeds in any case in conditions of absolute safety, without any need for the use of an inert gas as a diluent of acetylene.

According to a preferred embodiment of the invention, the alkaline hydroxide is added in the reaction medium in the shape of an aqueous solution, for instance a 50% solution, however, always respecting the maximum limits of the quantity of water present as stated above. The addition of the catalyst in this shape does not lower the final conversions and is extremely advantageous from the technological point of view, owing to the ease of introducing the catalyst into the reactant system, moreover permitting a better dosage of said catalyst.

Still more preferably, the alkaline solution is introduced into the solvent that already contains the ketone, thereby obtaining the immediate dissolution of the catalyst, but it would be possible to add the ketone at a further stage.

According to another embodiment of the invention, the temperature may be varied during the duration of the reaction, namely it may be increased as the reaction is proceeding. It has been found that in that case it is possible to attain the maximum temperature limit of +40° C. without any diminution of yields or any other inconveniences, while on the other hand the speed of reaction is increased and more rapid conversions are attained without departing from the limits of safety that must be respected to take into account the possible explosiveness of the mixtures of vapours present in the reaction medium. The variation of temperature may be continuous or stepwise.

The results obtained with the present invention are of great technical importance and they are surprising. In fact when operating according to the processes known heretofore, it is necessary to employ at least stoichiometric quantities of alkaline hydroxides as condensing agents and nothing could have made it predictable that the same alkaline hydroxides might act as catalysts. Their effectiveness to the contrary is so considerable when operating according to the invention, that it is possible to use them also in quantities smaller than one mole per 200 moles of ketone, thereby obtaining good yields and conversions on the ketone, though in practice it is not convenient to go below that limit. It is equally surprising that it is possible to obtain catalytic yields on the alkaline hydroxide and contemporaneously substantially quantitative yields on the ketone and high conversions, though operating in the presence of sensible quantities of water.

The process of the present invention can be conducted continuously operating for instance in a plant of the kind represented by the diagram of the sole figure, feeding a reactor R by means of special dosing pumps, with a solution of acetylene in ammonia from the tank A, with potash in 50% by weight aqueous solution, from the tank K, and ketone from the tank C in the desired ratios.

The acetylene consumed in the course of the reaction is made up for by taking it from the gas-holder G.

From the reactor R the reaction mixture passes over to the vessel N where the neutralization of the catalyst takes place, for instance with ammonium chloride taken from the tank S and from here it passes to an expansion chamber E, in which the acetylene and the ammonia are eliminated, which, by means of a special compressor P, are recycled into the reactor R, while the residual crude product containing the alkynol is sent to distillation D where it is separated from the impurities which are collected in W.

The invention will now be illustrated by some examples without limitation.

Example 1

Into an autoclave of stainless steel equipped with a stirrer with vanes, of 700 ml. capacity, there were introduced 4.2 g. of KOH, equivalent to 0.075 mole, dissolved in 4.2 g. of water.

To this solution were added 131 g. of anhydrous ammonia, equivalent to 7.7 moles. Then 78 g. of acetylene, equivalent to 3 moles, were dissolved in the ammonia. At that time, on having thermostatized the autoclave at the temperature of +10° C., 93.5 g. of anhydrous acetone, equivalent to 1.44 moles, were rapidly added by means of an injection pump.

After five hours' reaction, ammonium chloride dissolved in ammonia was introduced in an amount equivalent to 0.1 mole, to block the reaction. Then the autoclave was cooled down to −40° C. and the excess acetylene and ammonia were allowed slowly to evaporate. The liquid residue collected in water and neutralized with sulfuric acid was subjected to azeotropic distillation and 1.38 moles of methyl butynol were collected, equivalent to 96% with respect to the acetone employed with the reaction and equivalent to a yield on the catalyst of 18.40 moles of methyl butynol per mole of KOH.

The water represents totally (water liberated from the potash in the course of the reaction and water added as such) 4.24% by weight with respect to the ammonia.

The total pressure was 12 ata and the partial pressure of acetylene was 57% of the total pressure.

Example 2

Operating substantially as in Example 1, with a molar catalyst to acetone ratio of 1/30; acetone to acetylene=1/2 and acetylene to ammonia=3/7, at the temperature of +10° C. and taking samples at different times, two reactions were carried out using in one an anhydrous KOH and in the other one KOH in aqueous solution of 50%, the results of which are reported in Table 1.

TABLE 1

| Reaction time in minutes | 50% KOH solution moles methyl butynol produced, percent moles acetone used | Anhydrous KOH moles methyl butynol produced, percent moles acetone used |
|---|---|---|
| 30 | 54 | 64 |
| 60 | 65 | 72 |
| 90 | 72.2 | 77 |
| 120 | 76.5 | 80.5 |
| 180 | 83 | 85 |
| 240 | 86.2 | 87.2 |
| 300 | 89 | 89.2 |
| 420 | 91 | 91 |

The final yield on the catalyst corresponds in the two cases examplified to 26.40 moles of methyl butynol per mole of catalyst.

When in this example anhydrous potash was used the water that is substantially that liberated in the course of reaction, represents 0.88% by weight with respect to the solvent (ammonia); when instead hydrated potash was used, water is 3.52% with respect to the solvent and it is the sum of the water added as such and of that liberated in the reaction; in both cases the total pressure was 12.4 ata and the partial pressure of acetylene was 58% of the total pressure.

Example 3

Operating substantially as in Example 1, with molar acetone to acetylene ratios of 2/1, acetylene to ammonia=3/7, a series of reactions were carried out at the temperature of +10° C., the results whereof are reported in Table 2, using as a catalyst KOH in 50% aqueous solution and various molar catalyst to acetone ratios, namely 1/14; 1/19; 1/30; 1/45; 1/60.

TABLE 2

| Time of reaction in minutes | Moles of methyl butynol produced, percent moles of acetone put to react |||||
|---|---|---|---|---|---|
| | KOH/Acetone |||||
| | 1/14 | 1/19 | 1/30 | 1/45 | 1/60 |
| 30 | 68 | 62 | 52.6 | 44 | 44 |
| 60 | 79 | 73 | 65.1 | 54.25 | 53.26 |
| 90 | 85.4 | 81 | 72.25 | 61 | 59 |
| 120 | 89.2 | 86 | 76.5 | 65.5 | 63 |
| 180 | 93.7 | 92.5 | 83 | 71 | 68 |
| 240 | 95.8 | 95.4 | 86.2 | 75.9 | 72.3 |
| 300 | 96.2 | 96.0 | 89 | 79 | 75 |
| 420 | | | 91.47 | 83.15 | 79 |
| 480 | | | 91.61 | 84.25 | 79.5 |

From the reactions carried out with catalysts to acetone ratios=1:14 and 1:19, a precipitate was obtained which was constituted by alkaline methyl butynolate and the reaction proceeded in heterogeneous phase.

The percentage amounts of water totally present in the course of the tests are reported according to the ratios potash to ketone employed.

Potash to ketone: Total water with respect to solvent (by weight), percent 1 to 14 _____ 7.76
1 to 19 _____ 4.35
1 to 30 _____ 3.52
1 to 45 _____ 2.43
1 to 60 _____ 1.75

In all of the tests the total pressure was 12.4 ata and the partial acetylene pressure was 58% of the total.

Example 4

Operating substantially as in Example 1, with the following molar ratios:

Acetylene to acetone=2/1
Acetylene to ammonia=3/7 starting the reaction at +10° C. and bringing the temperature gradually up to 40° C. in 2 hours, a series of reactions were carried out using as a catalyst KOH in 50% aqueous solution and various catalyst to acetone ratios, namely 1/50, 1/60, 1/120, taking samples at different times as reported in Table 3.

TABLE 3

| Reaction time in minutes | Temperature, ° C. | Moles of methyl butynol produced, percent of acetone put to react | | |
|---|---|---|---|---|
| | | KOH/Acetone | | |
| | | 1/50 | 1/60 | 1/120 |
| 0 | +10 | | | |
| 30 | 25 | 61.47 | 54.47 | 46.87 |
| 60 | 35 | 77.8 | 73 | 63.2 |
| 120 | 40 | 94 | 88.2 | 81 |
| 180 | 40 | 97.7 | 93.67 | 87.5 |
| 240 | 40 | 97.3 | 95.6 | 90.1 |
| 360 | 40 | 97.3 | 95.15 | 92.8 |
| 420 | 40 | | | 94 |

In the range of catalyst to acetone ratio=1:120 a yield on the catalyst was attained of 111 moles of methyl butynol per mole of catalyst.

The percentage amounts are reported of water totally present in the course of the tests according to the potash to ketone ratios employed.

Potash to ketone — Total water with respect to the solvent (by weight), percent 1 to 50 _____ 2.2
1 to 60 _____ 1.75
1 to 120 _____ 0.88

At the beginning of the test the total pressure was 12.4 ata while the partial acetylene pressure was 58% of the total pressure; after the introduction of the acetone the total pressure and the acetylene partial pressure attain respectively the values of 10.3 ata and 49% of the total pressure, by effect of the acetylene becoming dissolved in the ketone. Subsequently while the temperature increases and the reaction proceeds with the progress of ethynylation the total pressure rises changing from 10.3 ata to 18 ata whilst the acetylene partial pressure diminishes down to values equivalent to 14% of the total pressure, at 40° C.

*Example 5*

Operating substantially as in Example 1, at constant temperature at +10° C., using anhydrous NaOH as a catalyst, with the following molar ratios:

NaOH to acetone=1/28
Acetylene to acetone=2/1
Acetylene to ammonia=3/7.5 a reaction was carried out taking samples at different times, as reported in Table 4.

TABLE 4

| Reaction time in minutes | Moles of methyl butynol produced, percent moles acetone used |
|---|---|
| 30 | 60.5 |
| 60 | 72 |
| 90 | 77.9 |
| 120 | 81.2 |
| 150 | 83 |
| 180 | 84 |

In this test the total pressure was 11.5 ata and the acetylene partial pressure was 54% of the total pressure while the water totally present was 0.7% with respect to the solvent.

*Example 6*

Operating substantially as in Example 1, employing however methyl-t-butyl ketone in lieu of acetone, with molar ratios:

KOH to ketone=1/16
Acetylene to ketone=3/1
Acetylene to ammonia=1/4 at the temperature of +10° C., after 4 hours reaction, 98.1% of 1-pentyn-3,4,4-trimethyl-3-ol was collected with respect to the ketone used.

In this test the total pressure was 12 ata, the acetylene partial pressure was 45% of the total pressure while the water totally present was 7% with respect to the solvent.

*Example 7*

Operating as in the preceding example, but using acetophenone as a ketone, 90% of 1-butyn-3-phenyl-3-ol was collected.

In this test the values of total pressure, of acetylene partial pressure and the quantity of water were identical to those of Example 6.

*Example 8*

Example 1 was repeated employing diacetone alcohol in lieu of acetone. The moles of diacetone alcohol employed are the half of those of acetone. In such conditions were obtained 1.38 moles of methyl butynol equivalent to a yield on the catalyst of 18.40 moles of alkynol per mole of catalyst. This example clearly shows how the acetone can be replaced by diacetone alcohol and how logically the moles of the latter are the half of those necessary in the case of acetone.

In this test the values of total pressure, of acetylene partial pressure and the quantity of water were identical to those of Example 1.

*Example 9*

Operating substantially as in Example 1, with a molar anhydrous KOH to acetone ratio=1/10; acetone to acetylene=1/10 and acetylene to ammonia=3/9 at the temperature of —40° C., after only 3 hours of reaction there was obtained 90% of methyl butynol with respect to the acetone used.

In this test the total pressure was 2.3 ata, the acetylene partial pressure was 54% of total pressure while water totally present was 4.24% with respect to the solvent.

*Example 10*

Operating with the following ratios:

Acetylene to ammonia=1 to 10
Acetone to acetylene=1 to 10
Potash to acetone=1 to 200 a test was carried out at a temperature of +30° C. for a duration of 5 hours. In this test the water totally present was 0.025% by weight with respect to the solvent, the total pressure was 14 ata and the acetylene partial pressure was 20% of the total pressure.

In that way conversions were obtained on acetone, of 98.45% and yields, on the catalyst, equivalent to 195.8 methyl butynol per mole of catalyst.

It should be noted that in this test the conversion on acetone attains 98.45% owing to the great excess of acetylene with respect to the ketone.

It will be seen then that the reaction can be effected in the presence of water in a quantity not less than 0.025% and not over 10% by weight with respect to the solvent.

We claim:

1. A process for the preparation of acetylenic alcohols comprising reacting acetylene with a ketone in liquid ammonia, the ketone being of the general formula R—CO—R', wherein R and R' are selected from the group consisting of aryl groups and of alkyl groups having 1 to 4 carbon atoms, and in the presence of an alkaline hydroxide in aqueous solution as a catalyst, the operation being effected in the presence of water in a quantity that initially is not less than 0.025% and that in the course of the reaction does not total more than 10% by weight with respect to the solvent used, including the water formed in the reaction, and at temperatures of from −40° C. to +40° C., the acetylene being in molar excess with respect to the ketone, the molar ratio of the acetylene to the ketone being in the range 1.5:1 to 10:1.

2. A process according to claim 1, wherein the ketone is acetone.

3. A process according to claim 1, wherein the alkaline hydroxide is selected from the group consisting of sodium hydroxide and potassium hydroxide.

4. A process according to claim 1, wherein the reaction temperature is from +10° C. to +30° C.

5. A process according to claim 1, wherein the temperature is increased continuously during the course of the reaction but in no case to exceed the maximum temperature of +40° C.

6. A process according to claim 1, wherein the temperature is increased step-by-step during the course of the reaction but in no case to exceed the maximum temperature of +40° C.

7. A process according to claim 3, wherein the molar ratio of the alkali metal hydroxide to the ketone is not greater than 1:10.

8. A process according to claim 7, wherein the molar ratio of the alkali metal hydroxide to the ketone is not greater than 1:30.

9. A process according to claim 3, wherein the molar ratio of the alkali metal hydroxide to the ketone is no smaller than 1:200.

10. A process according to claim 1, wherein the pressure of the acetylene at the beginning of the reaction is no greater than 60% of the total pressure due to the ammonia and to the acetylene.

11. A process according to claim 1, wherein the total pressure is from 1 to 18 absolute atmospheres.

12. A process according to claim 1, wherein the molar ratio of acetylene to solvent is from 3:7 to 3:30.

13. A process according to claim 1, wherein the operation is effected by continuously feeding to a reaction vessel under pressure a solution of the acetylene in liquid ammonia, and an aqueous solution of an alkali metal hydroxide and acetone in a molar ratio not exceeding 1 to 10, and wherein the reaction product is withdrawn from the reaction vessel, the catalyst is neutralized, the acetylene excess and the ammonia are separated, and the alkynol is distilled.

References Cited by the Examiner
UNITED STATES PATENTS
3,082,260   3/1963   Tedeschi _____ 260—638

LEON ZITVER, *Primary Examiner.*

M. B. ROBERTO, J. E. EVANS, *Assistant Examiners.*